United States Patent
Toullier et al.

(10) Patent No.: US 6,807,373 B1
(45) Date of Patent: Oct. 19, 2004

(54) MULTIBAND RAMAN AMPLIFIER

(75) Inventors: Denis Toullier, Fleury les Aubrais (FR); Jean-Pierre Blondel, Buc (FR); Eric Brandon, Bourg la Reine (FR); Patrice Le Roux, Montlhery (FR)

(73) Assignee: Alcatel, Paris (FR)

( * ) Notice: Subject to any disclaimer, the term of this patent is extended or adjusted under 35 U.S.C. 154(b) by 520 days.

(21) Appl. No.: 09/597,081

(22) Filed: Jun. 20, 2000

(30) Foreign Application Priority Data

Jun. 21, 1999 (FR) .............................. 99 07814

(51) Int. Cl.[7] .............................................. H04J 14/02
(52) U.S. Cl. ........................... 398/92; 398/79; 398/82; 398/87; 398/84
(58) Field of Search .................... 359/115, 124, 359/127, 130, 133, 345, 349; 398/79, 82, 83, 87, 92, 84

(56) References Cited

U.S. PATENT DOCUMENTS

| | | | |
|---|---|---|---|
| 4,805,977 A | | 2/1989 | Tamura et al. ............ 350/96.16 |
| 5,608,825 A | | 3/1997 | Ip ................................ 385/24 |
| 5,652,675 A | * | 7/1997 | Shibuya ..................... 359/341.2 |
| 5,748,350 A | | 5/1998 | Pan et al. .................... 359/130 |
| 5,812,712 A | * | 9/1998 | Pan .............................. 385/37 |
| 6,041,152 A | * | 3/2000 | Clark ........................... 385/24 |
| 6,288,810 B1 | * | 9/2001 | Grasso et al. ............... 359/127 |
| 6,320,884 B1 | * | 11/2001 | Kerfoot et al. ................ 372/3 |
| 6,449,072 B1 | * | 9/2002 | Sian et al. .................... 398/82 |

OTHER PUBLICATIONS

Masuda, H. et al.: "Wide–Band and Gain–Flattened Hybrid Fiber Amplifier consisting of an EDFA and a Multiwavelength pumped Raman amplifiers" IEEE Photonics Technology Letters, US, IEEE, Inc., New York, vol. 11, No. 6, Jun. 6, 1999, pp. 647–349, XP000835425.

* cited by examiner

*Primary Examiner*—M. R. Sedighian
(74) *Attorney, Agent, or Firm*—Sughrue Mion, PLLC

(57) ABSTRACT

The invention relates to a system for injecting into a fiber signals from multiple sources at different wavelengths. The signals from each source are injected into the fiber by a circulator. The circulators of the various sources are cascaded. Reflector means for reflecting signals from sources previously injected are provided between each source and its circulator. The invention is used to inject signals from multiple sources without the injection of signals from one source attenuating signals from sources previously injected. It applies in particular to Raman amplification, for which purpose it provides a multiband source without attenuation between bands. Multiband amplifications is achieved without loss of gain between bands.

14 Claims, 1 Drawing Sheet

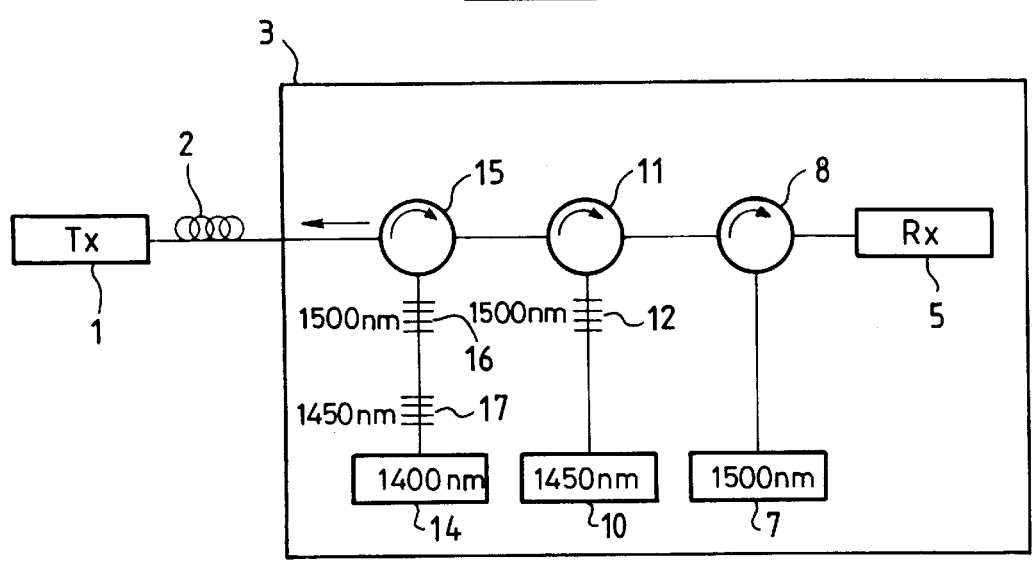
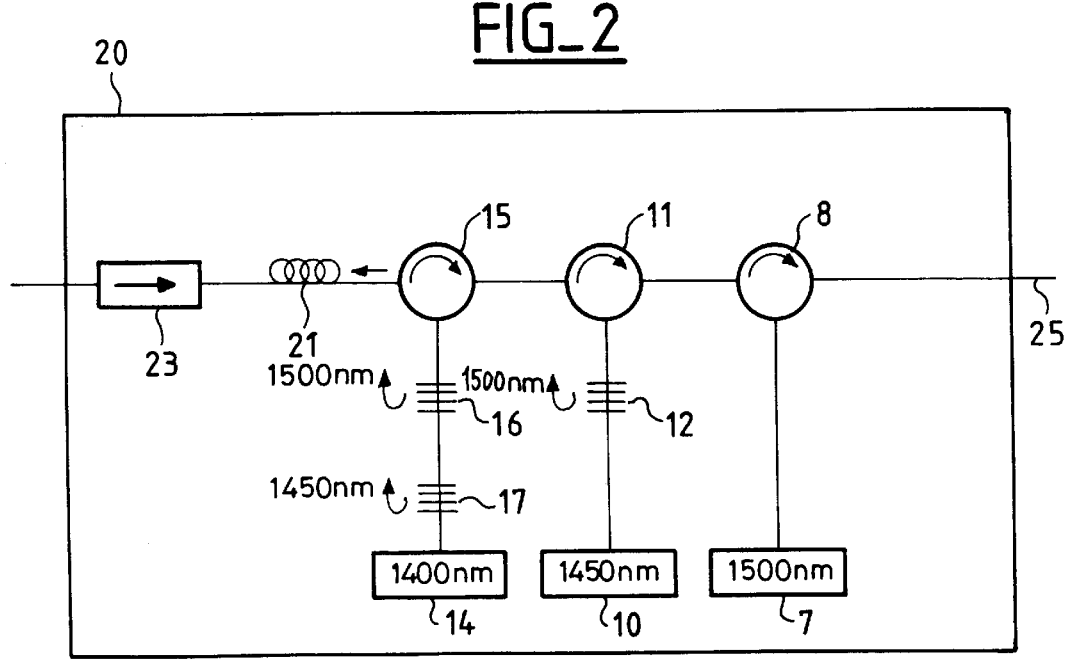

MULTIBAND RAMAN AMPLIFIER

The present invention relates to the field of fiber optic transmission and in particular to repeaterless transmission systems. It relates in particular to wavelength division multiplex (WDM) fiber optic transmission systems.

BACKGROUND OF THE INVENTION

Optical amplifiers, and in particular erbium-doped optical fiber amplifiers, are provided at regular intervals along one type of prior art system for transmitting signals in optical fibers. A solution of this kind is described in Bergano, "Long haul WDM transmission using optimum channel modulation: 32×5 Gbit/s 9300 km demonstration", OFC'97 post deadline 16, for example. The transmission distances in a system of the above kind are limited by the signal-to-noise ratio and in particular by amplified spontaneous emission (ASE) generated in the amplifiers.

The article by Morten Nissov et al, "100 Gb/s (10×10 Gb/s) WDM transmission over 7 200 km using distribution Raman amplification", OFC'97, post deadline paper, proposes the use in a transmission system of only distributed stimulated Raman scattering (SRS) amplification to amplify the signal at regular intervals. This solution improves the signal-to-noise ratio by about 2 dB compared to a comparable solution using only discrete pumps. A description of the Raman effect is given in "Nonlinear Fiber Optics" by G. P. Agrawal, Academic Press, 1980.

P. B. Hansen et al., in "Unrepeated WDM Transmission Experiment with 8 Channels of 10 Gb/s over 352 km", IEEE Photonics Technology Letters vol. 8, no. 8, Aug. 1996, pages 1082–1084, describe a repeaterless transmission system with remote pumping of erbium-doped fiber sections of the transmission system at a distance from the transmitter and the receiver and pumped by sources respectively in the receiver and in the transmitter.

French Patent Application 98 16496 filed Dec. 28, 1998, whose title in translation is "Quasi-distributed amplification in a fiber optic transmission system", proposes a repeater for a fiber optic transmission system which includes a discrete amplifier, for example an erbium-doped fiber amplifier, with at least one pump for producing amplification in the line fiber by stimulated Raman scattering.

One problem encountered with Raman amplification concerns the wavelength of the pumps employed. This problem arises in particular in Raman amplification of wavelength division multiplexed signals which extend over a wide range of wavelengths. This problem is mentioned by S. V. Chernikov et al. in "Broadband Raman amplifiers in the spectral range of 1480–1620 nm", OFC'99 m, WG6, pages 117–119. The solutions proposed in the above document are to cascade amplifiers having different pump wavelengths or to couple pumps at multiple wavelengths into a single amplifier.

However, the above document does not describe any way of coupling pumps at multiple wavelengths into a single amplifier.

OBJECTS AND SUMMARY OF THE INVENTION

The invention proposes a simple and effective solution to the above problem which can be implemented using a limited number of standard optronic components to provide continuous and uninterrupted amplification in the wanted band.

To be more precise, the invention proposes a system for injecting into a fiber signals from multiple sources at different wavelengths, the system comprising:
a first signal source,
a first circulator with a first input connected to the first source,
a second signal source, and
a second circulator with a first input connected to the second signal source via reflector means for reflecting signals from the first source, a second input supplying the signals from the first and second signal sources, and a third input connected to a second input of the first circulator.

One embodiment of the system further includes:
a third signal source, and
a third circulator with a first input connected to the third signal source via reflector means for reflecting signals from the first source and the second source, a second input supplying the signals from the first, second and third signal sources, and a third input connected to the second input of the second circulator.

In this case the system can further include:
an nth signal source, and
an nth circulator with a first input connected to the nth signal source via reflector means for reflecting signals from sources of rank less than n, where n is an integer varying from 4 to M and M is the total number of sources injected, a second input supplying the signals from the signal sources of rank 1 to n, and a third input connected to the second input of the circulator of rank n−1.

Each of the signal sources advantageously comprises a pump.

In one embodiment, the reflector means comprise Bragg gratings.

The invention also proposes an amplifier comprising a system as defined above for injecting pump signals and an amplifier fiber connected to the second output of the highest rank circulator.

The amplifier fiber is preferably a line fiber.

In another embodiment the amplifier fiber is not a line fiber.

Amplification is advantageously effected in the amplifier fiber by stimulated Raman scattering.

The invention finally proposes a fiber optic transmission system comprising an amplifier as defined above.

BRIEF DESCRIPTION OF THE DRAWING

Other features and advantages of the invention will become apparent on reading the following description of embodiments of the invention, which description is given by way of example only and with reference to the accompanying diagrammatic drawing, in which:

FIG. 1 shows a first embodiment of an amplifier according to the invention, and

FIG. 2 shows a second embodiment of an amplifier according to the invention.

MORE DETAILED DESCRIPTION

To couple a plurality of pumps into a fiber, the invention proposes to use cascaded circulators to inject each pump. A reflector between each pump and its circulator reflects the pumps already injected. The invention therefore provides a simple way of injecting pumps at different wavelengths into a fiber without the injection of any pump significantly attenuating the signals from preceding pumps.

FIG. 1 is a diagrammatic representation of a first embodiment of an amplifier of the invention. The FIG. 1 embodiment is applied to a repeaterless fiber optic transmission system.

FIG. 1 shows the transmitter TX 1, the line fiber 2 and the receiver terminal 3. The receiver terminal includes a receiver 5. These components are known in the art and are not described in more detail as it is not necessary to understand their operation to understand the invention. Distributed preamplification by stimulated Raman scattering uses three contra-propagating pumps at 1450 nm, 1500 nm and 1550 nm. The first pump 7 at 1500 nm is injected into the line fiber via a first circulator 8 adjacent the receiver 5 in the terminal 3. The circulator has three inputs, as is known in the art. The first input receives the signal from the pump. The second input receives the signals from the line fiber and the third input is connected to the receiver. The pump signals arriving at the first input are therefore transmitted to the second input and therefore injected into the line fiber in a propagation direction opposite that of the signal. The signals from the line fiber reaching the circulator at its second input are transmitted to the third input and to the receiver. No signal from the receiver reaches the third input of the circulator.

The second pump 10 at 1450 nm is injected into the line fiber via a second circulator 11 adjacent the first circulator. A reflector 12, for example a Bragg grating, between the second circulator and the second pump reflects the signals from the first pump. The second circulator is also a three-input circulator. The first input receives the signal from the second pump. The second input receives the signals from the line fiber and the third input is connected to the second input of the first circulator. The signals from the second pump reaching the first input are therefore transmitted to the second input and are therefore injected into the line fiber in a propagation direction opposite that of the signal. The signals from the line fiber reaching the circulator at its second input are transmitted to the third input and to the receiver via the first circulator. The signal from the first pump coming from the first circulator enters the second circulator at its third input. It is transmitted to the first input, reflected by the reflector and enters the circulator again at its first input. It is finally transmitted to the second input of the second circulator and therefore to the line fiber. The signals from the first and second pumps are therefore found in the line fiber upstream of the second circulator.

The third pump 14 at 1400 nm is injected in a similar fashion into the line fiber via a third circulator 15 adjacent the second circulator. Two reflectors 16 and 17, for example Bragg gratings, between the third circulator and the third pump reflect the signals from the first and second pumps. The third circulator is also a three-input circulator. The first input receives the signal from the third pump. The second input receives the signals from the line fiber and the third input is connected to the second input of the second circulator. The signals from the third pump reaching the first input are therefore transmitted to the second input and are therefore injected into the line fiber in a propagation direction opposite that of the signal. The signals from the line fiber reaching the circulator at its second input are transmitted to the third input and to the receiver via the first circulator and the second circulator. The signals from the first and second pumps coming from the second circulator enter the third circulator at its third input. They are transmitted to the first input, reflected by the two reflectors and enter the third circulator again at the first input. They are finally transmitted to the second input of the third circulator and therefore to the line fiber. The signals from the first, second and third pumps are therefore found in the line fiber upstream of the third circulator.

In accordance with the invention, all of the signals from the three pumps propagating in the direction indicated by the arrow in the figure, i.e. in a direction opposite the direction of propagation of the signals, are present in the line fiber upstream of the terminal 3. It is clear from how the FIG. 1 system operates that injecting signals from the second and third pumps into the line fiber via the second and third circulators does not in any way attenuate the signals from the preceding pumps. The invention provides a multiband pump signal which enables pumping over a wide range of wavelengths free of the insertion losses of the various pumps. Thus preamplification by the Raman effect is obtained in the line fiber upstream of the terminal 3.

The signals reaching the receiver pass successively through the third, second and first circulators before reaching the receiver. Losses are minimal because the circulators are highly efficient. Circulator insertion losses are typically less than approximately 1 dB.

The embodiment shown in FIG. 1 can use pumps of any kind, for example semiconductor pumps. Bragg gratings can be used as the reflectors, and have the advantage of being transparent to the signals coming directly from the pumps. Other reflectors can be used instead.

FIG. 2 is a diagrammatic representation of a second embodiment of an amplifier according to the invention. In the FIG. 2 embodiment, the amplifier 20 is a discrete amplifier. As in the FIG. 1 system, this system includes the first pump 7, the first circulator 8, the second pump 10, the second circulator 11, the reflector 12, the third pump 14, the third circulator 15 and the two reflectors 16 and 17. These components are disposed and operate in the same way as the corresponding components from FIG. 1 and are not described again.

An amplifier fiber 21 is connected to the second output of the third circulator. A low effective area fiber can be used, for example, to improve the efficiency of Raman amplification. At the other end of the fiber 21 is an isolator 23 which prevents subsequent propagation of the pump signals to the line fiber. The isolator also prevents oscillation caused by the gain of the discrete amplifier and reflections externally of the amplifier. The input of the isolator constitutes the input of the amplifier 20. Other filters or other components unrelated to the invention can of course be provided.

On the output side of the amplifier, the line fiber 25 is connected to the third input of the first circulator.

The FIG. 2 system therefore constitutes a discrete amplifier employing stimulated Raman scattering and amplifies over a wide band. As in the FIG. 1 system, the FIG. 2 system enables several pumps to be injected into the amplifier fiber without the injection of the new pumps significantly attenuating pump signals already injected.

Of course, the present invention is not limited to the examples and embodiments described and shown and is open to many variants that will be evident to the skilled person. Thus it is clear that the invention is not limited to injecting three pumps and could be used to inject two pumps or four pumps or more. In this case, to inject M pumps, the invention proposes to use, in addition to the components already described with reference to FIGS. 1 and 2, an nth circulator for the nth pump with a first input connected to the nth pump via means for reflecting signals from pumps of rank less than n, a third input connected to the second input of the (n−1)th circulator and a second input supplying the signals coming from the pumps of rank 1 to n. If M is the total number of pumps injected, n is an integer varying from 4 to M.

In the embodiments shown in the figures, the invention is applied to injecting pumps for amplification by stimulated Raman scattering. The invention could have other applications, where it is required to inject a plurality of signals in different bands into a fiber without the injection of new signals attenuating signals previously injected. From this point of view, the pumps are merely sources of particular signals.

The embodiments shown in the figures refer to sources of signals at different wavelengths. The Bragg gratings used as reflector means in the examples reflect the signals from the preceding pumps but would also reflect the signals from the adjacent pump if they had the same wavelength as the preceding pumps. If other semireflecting means were used, the same wavelength could be injected from multiple sources.

What is claimed is:

1. A system for injecting, into an amplifier fiber, pumping signals from multiple pumping sources at different wavelengths, the system comprising:

an output via which a transmission signal that is amplified by the amplifier fiber exits said system, a first pumping signal source supplying a first pumping signal, a first circulator with a first input connected to the first pumping signal source, a second input supplying the first pumping signal from the first pumping signal source and receiving the transmission signal, and a third input supplying the transmission signal to said output, a second pumping signal source supplying a second pumping signal, and a second circulator with a first input connected to the second signal source via reflector means for reflecting the first pumping signal from the first pumping signal source, a second input supplying the first and second pumping signals from the first and second pumping signal sources and receiving the transmission signal, and a third input connected to a second input of the first circulator, receiving the first pumping signal from the first circulator and supplying the transmission signal to the first circulator.

2. A system according to claim 1, further including:

a third pumping signal source supplying a third pumping signal, and a third circulator with a first input connected to the third signal source via reflector means for reflecting the first and second pumping signals from the first source and the second pumping signal sources, a second input supplying the first, second, and third pumping signals from the first, second and third pumping signal sources and receiving the transmission signal, and a third input connected to the second input of the second circulator, receiving the first and second pumping signals from the second circulator and supplying the transmission signal to the second circulator.

3. A system according to claim 2, further including:

an nth pumping signal source supplying an nth pumping signal, an nth circulator with a first input connected to the nth pumping signal source via reflector means for reflecting pumping signals from pumping sources of rank less than n, where n is an integer varying from 4 to M and M is the total number of pumping sources injected, a second input supplying the pumping signals from the pumping signal sources of rank 1 to n and receiving the transmission signal, and a third input connected to the second input of the circulator of rank n−1, receiving the pumping signals of rank 1 to n−1 and supplying the transmission signal to the circulator of rank n−1.

4. An amplifier comprising a system according to claim 2 and the amplifier fiber, said system injecting the first, second, and third pumping signals into an end of the amplifier fiber connected to the second input of said third circulator, wherein the transmission signal is supplied to an other end of the amplifier fiber.

5. The system claimed in claim 1, wherein the reflector means comprise Bragg gratings.

6. An amplifier comprising a system according to claim 1 and the amplifier fiber, said system injecting the first and second pumping signals into an end of the amplifier fiber connected to the second input of said second circulator, wherein the transmission signal is supplied to an other end of the amplifier fiber.

7. An amplifier according to claim 6, wherein the amplifier fiber is a line fiber.

8. An amplifier according to claim 6, wherein the amplifier fiber is not a line fiber.

9. An amplifier according to claim 6, wherein amplification is effected in the amplifier fiber by stimulated Raman scattering.

10. A fiber optic transmission system comprising an amplifier according to claim 6.

11. An amplifier comprising a system according to claim 3 and the amplifier fiber, said system injecting the pumping signals of rank 1 to n into an end of the amplifier fiber connected to the second input of the circulator of rank M, wherein the transmission signal is supplied to an other end of the amplifier fiber.

12. An amplifier according to claim 6, further comprising an isolator at said other end of the amplifier fiber where the transmission signal is supplied, preventing subsequent propagation of the first and second pumping signals.

13. A receiver terminal comprising a system according to claim 1 and a receiver, said receiver receiving the transmission signal from said output.

14. A receiver terminal according to claim 13, wherein no signal from the receiver reaches the third input of the first circulator.

* * * * *